United States Patent
Bodeau et al.

(10) Patent No.: US 6,867,391 B2
(45) Date of Patent: Mar. 15, 2005

(54) CONTROL SYSTEM FOR ELECTROSTATIC DISCHARGE MITIGATION

(75) Inventors: John Michael Bodeau, Yorba Linda, CA (US); Philip L. Leung, La Canada, CA (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 10/279,721

(22) Filed: Oct. 24, 2002

(65) Prior Publication Data

US 2004/0079744 A1 Apr. 29, 2004

(51) Int. Cl.[7] ................................. H05B 3/00
(52) U.S. Cl. .................. 219/209; 219/210; 219/200; 219/201; 361/212
(58) Field of Search .................... 219/209, 210, 219/240, 490, 528, 543, 548, 549, 200, 201, 447.1; 361/212; 204/164; 313/325; 315/363

(56) References Cited

U.S. PATENT DOCUMENTS

| | | | | |
|---|---|---|---|---|
| 3,289,046 A | * | 11/1966 | Carr | 219/201 |
| 3,395,265 A | * | 7/1968 | Weir | 219/209 |
| 3,440,407 A | * | 4/1969 | Amato et al. | 219/209 |
| 3,816,702 A | * | 6/1974 | Green | 219/209 |
| 4,481,403 A | * | 11/1984 | Del Monte | 219/209 |
| 5,268,558 A | * | 12/1993 | Youssef et al. | 219/209 |
| 5,539,186 A | * | 7/1996 | Abrami et al. | 219/548 |
| 6,114,674 A | * | 9/2000 | Baugh et al. | 219/543 |
| 6,184,501 B1 | * | 2/2001 | Zapf | 219/447.1 |
| 6,262,392 B1 | * | 7/2001 | Morton et al. | 219/209 |

* cited by examiner

Primary Examiner—Fadi H. Dahbour
(74) Attorney, Agent, or Firm—Artz & Artz, PC

(57) ABSTRACT

A control circuit (20) for controlling electrostatic discharge in an electric component includes a heater (28) that is thermally coupled to the component. A sensor (30) is used for sensing a sensed condition. A controller is coupled to the heater and the sensor. The controller (24) heats the component in response to the sensed condition. The sensor (30) may include an electron flux level near the component or a surface potential of the component itself.

27 Claims, 2 Drawing Sheets

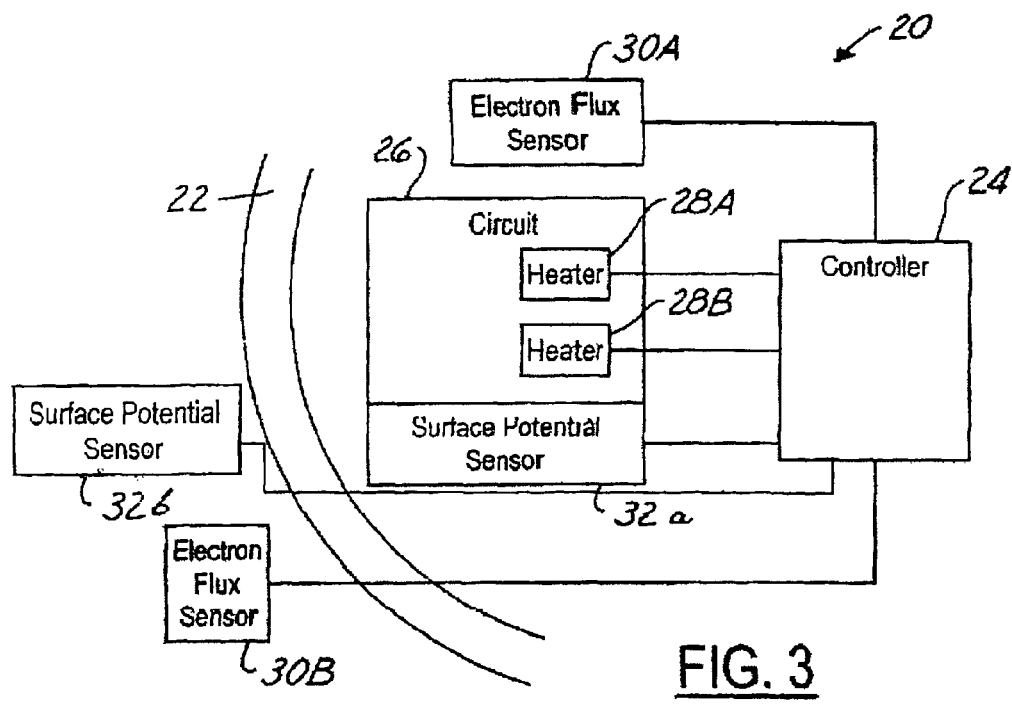
FIG. 3
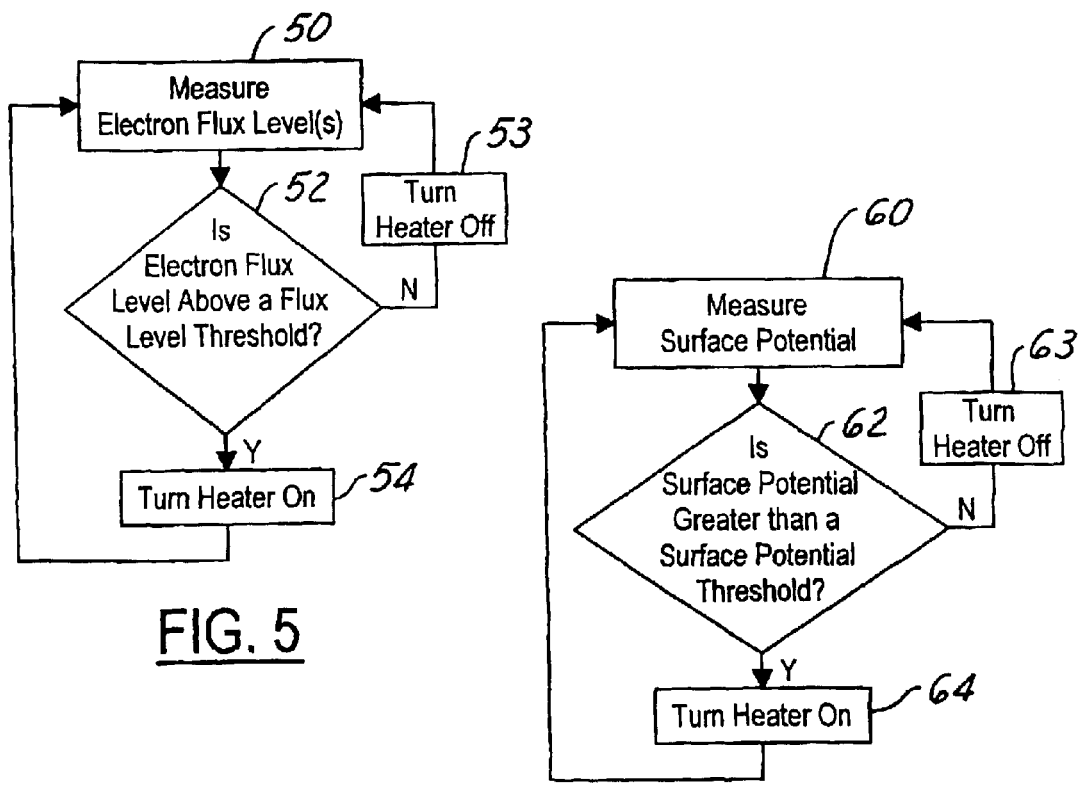
FIG. 5
FIG. 6

CONTROL SYSTEM FOR ELECTROSTATIC DISCHARGE MITIGATION

TECHNICAL FIELD

The present invention relates generally to dielectric components, and more particularly, to charge mitigation for use with the electronic components that is particularly useful in a spacecraft environment.

BACKGROUND ART

Electrical components are typically mounted on a non-conductive or dielectric material. Such devices are often used in a space environment. Usually the space environment is quiet in terms of the electron flux level. Thus, the electric field stays below a dielectric breakdown level of the non-conductive material. At certain times, however, the electron flux and corresponding electric field may increase. The electric field (E) within a non-conductive material is directionally proportional to the product of the resistivity of the material ($\rho$) and the incident electron flux level (J). That is, $E=\rho J$. Whenever the electron flux level exceeds a threshold that causes the induced electric field to exceed the dielectric breakdown strength, electrostatic discharges occur which may damage the electronic components.

One way in which to mitigate electrostatic discharge is to apply a conductive coating to a non-conductive surface. This technique is not always practical because the thermal properties and RF transmission characteristics may be adversely affected by the conductive coating.

Another manner in which the electrostatic discharge is mitigated is to increase the amount of shielding on the spacecraft. However, it is always a goal to reduce weight in spacecraft. Increasing the weight increases the costs of launch and may reduce the mass usable for a payload.

It would therefore be desirable to provide a system that reduces the potential for electrostatic discharge while minimally affecting the payload or weight.

SUMMARY OF THE INVENTION

It is therefore one object of the invention to provide a system that allows the electric field to stay below a dielectric breakdown condition in a component.

In one aspect of the invention, a control circuit for controlling electrostatic discharge in an electric component includes a heater and thermistor that are thermally coupled to the component. A sensor on board the spacecraft is used for sensing a sensed condition. A controller is coupled to the heater and the sensor. The controller heats the component to raise its temperature, which is measured by the thermistor, in response to the sensed condition. The sensor may include an electron flux level near the component or a surface potential of the component itself. This control scheme is closed loop. Alternatively, the sensor may be located on another satellite (such as the electron flux monitors on the GOES satellites), or may be ground-based (such as the CANOPUS magnetometer chain). Information from those sensors can be utilized by the satellite operators to determine when to command heaters on and off. This scheme is open loop.

In a further aspect of the invention, a method for controlling electrostatic discharge of an electrical component comprises measuring an electrical condition proximate a component, and activating a heater to heat the component in response to the electrical condition.

One advantage of the invention is that the heaters provided in the present invention may be implemented in a relatively light manner. That is, the heaters included in the present invention will minimally affect the payload capacity and payload volume.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 3 is a block diagrammatic schematic view of a control circuit according to the present invention.

FIG. 5 is a flow chart illustrating the use of an electron flux sensor as a controlling parameter according to the present invention.

FIG. 6 is a flow chart illustrating the use of surface potential monitor as a controlling parameter according to the present invention.

BEST MODE FOR CARRYING OUT THE INVENTION

Figure 1:
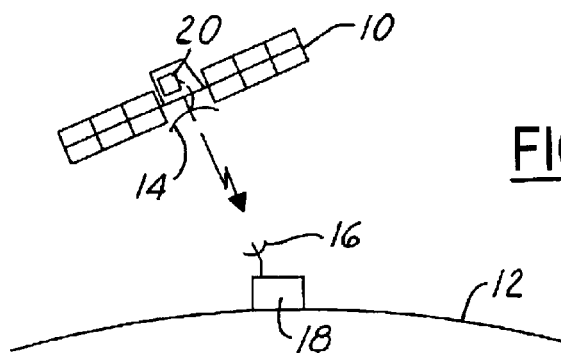
FIG. 1 is a diagrammatic view of a spacecraft having the control circuit of the present invention.

In the following figures the same reference numerals will be used to identify the same components. The present invention is described with respect to a satellite. However, the present invention has various other applications including space-based applications and non space-based applications.

Referring now to FIG. 1, a satellite 10 is illustrated above earth 12. Satellite 10 has an antenna 14 that is used to communicate with an antenna 16 on a ground station 18. Satellite 10 includes a control circuit 20 according to the present invention. Control circuit 20 may be incorporated on to various types of telemetry, command, and control circuits. Control circuit 20 may actually be incorporated into such circuits.

Figure 2:
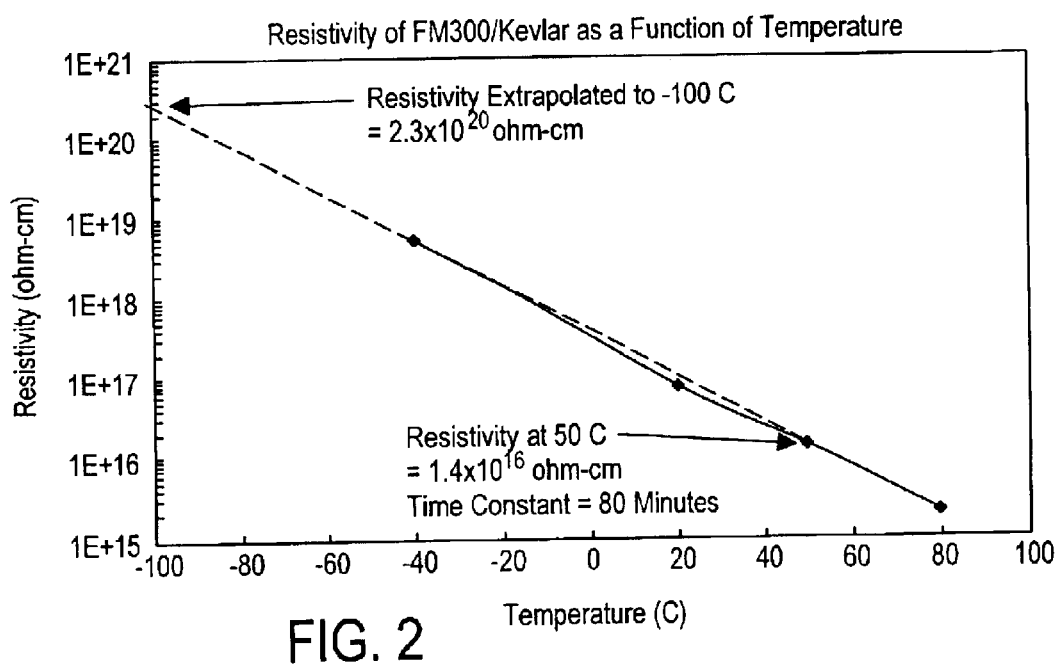
FIG. 2 is a plot of resistivity versus temperature for a commonly used dielectric material such as Kevlar®.

Referring now to FIG. 2, as mentioned above, the spacecraft environment is typically quiet in terms of electron flux levels. However, when the electron flux levels increase the electric field may increase and cause breakdown of the non-conductive material. As illustrated in FIG. 2, Kevlar®, which is a common composite material, has a resistivity that decreases as the temperature increases. As can be seen, the resistivity of the composite material at 80° C. is more than two orders of magnitude lower than the resistivity at 20° C. The present invention seeks to change the temperature of the material by focally heating the non-conductive material. At the higher temperature, the resistivity and the electrical field are reduced, and consequently the risk of an electrostatic discharge is greatly reduced. Because the electrical and mechanical properties of the non-conductive materials and the electronic components mounted upon them degrade faster at higher temperatures, the present invention commands heating of the dielectric material only when the risk of ESD is high. The combination of a sensor(s) and control system (open or closed loop) with the heaters provides a novel method of mitigating conditions leading to electrostatic discharge without the application of excessive heating that would increase the failure rate of the electronics.

Referring now to FIG. 3, control circuit 20 is illustrated within a housing 22. Housing 22 may be an internal component of the spacecraft or a portion of the spacecraft by itself. Control circuit 20 includes a controller 24. Controller 24 may be a separate component or may be integrated into one of the various telemetry command and control systems of the satellite 10. A circuit 26 having a dielectric or non-conductive material is positioned within housing 22. Circuit 26 has a heater 28A and 28B positioned thereon. Although two heaters are illustrated, only one heater may be required. Also, several heaters may be included on the circuit 26 or various other circuits. Heater 28A, 28B are coupled to controller 24. Controller 24 controls the operations of heaters as will be further described below. Electron flux sensors 30A and 30B are illustrated coupled to controller 24. Electron flux sensors 30A and 30B provide an indication as to the electron flux proximate circuit 26. As illustrated, electron flux sensor 30A is positioned within housing 22. Electron flux sensor 30B is positioned outside of housing 22. Each electron flux sensor, however, provides an indication to the electron flux proximate circuit 26. Electron flux sensor 30A provides the indication of the electron flux proximate circuit 26 to controller 24 so that the heaters 28A, 28B may be controller accordingly.

A surface potential sensor 32a is illustrated coupled to controller 24. Surface potential sensor 32a is physically coupled to the non-conductive material and measures the surface potential of the non-conductive material within circuit 26. A surface potential sensor 32b, located outside the housing 22, is also illustrated coupled to the controller 24. Surface potential sensor 32b is physically coupled to the surrogate dielectric 33, which mimics the behavior of the non-conductive material within circuit 26 inside housing 22. In response to the surface potential measured by sensors 32a or 32b, controller 24 controls the heaters 28A and 28B accordingly.

It should be noted that implementation of control circuit 20 may include either electron flux sensors 30A, 30B or surface potential sensor 32a, 32b, or any combination.

Electron flux sensors 30A, 30B and surface potential monitor 32b are commercially available. Thus, the present invention may take advantage of an already existing sensor.

Figure 4:
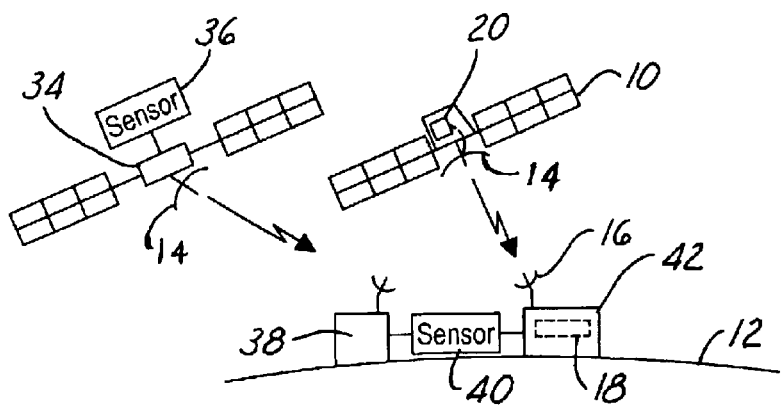
FIG. 4 is a diagrammatic view of a spacecraft relative to the earth according to the present invention.

Referring now to FIG. 4, the above embodiments describe the flux sensor or surface potential sensor as being on the same spacecraft as the circuit. However, a nearby satellite 34 may also have an electron flux sensor or surface potential sensor 36 thereon that senses the electron flux in space or electric field in a dielectric, respectively, and communicates this information to a ground station 38. In addition, ground station 38 or ground station 18 may also be coupled to a ground-based space weather sensor 40. Space weather sensor 40 measures the intensity of the electron flux in space by monitoring indirect effects, such as transient changes in the Earth's magnetic field, and communicates to either ground station 38 which in turn communicates it through a network or other means to ground station 18. Sensor 40 may also be directly connected to ground station 18. Thus, a controller 42 positioned within ground station 18 may actually command the heaters onboard the spacecraft to activate or deactivate. Thus, the sensor may be located within the same satellite as the circuit, outside the same satellite as the circuit, within another satellite or on the ground. The controlling may be performed within the satellite having the circuit to be heated or on the ground.

Referring now to FIG. 5, a method for controlling a circuit using an electron flux sensor is illustrated. In step 50 the electron flux level 50 is measured proximate the circuit. As mentioned above, this may be measured at the circuit, at the spacecraft, at another spacecraft or on the ground. The electron flux level measured in step 50 is compared to a flux level threshold in step 52. If the measured flux is below an electron threshold level in step 52, the heater is turned off in step 53 and the electron flux level is again measured in step 50. If the electron flux level is above a flux level threshold in step 52, a heater is turned on in step 54. The system returns to step 50 which continuously measures the electron flux level. Thus, as the flux level increases above a threshold the heater remains on, and when the electron flux falls below the flux level threshold, the heater is turned off. Thus, the resistivity of the material of circuit 26 is changed only for the duration of high electron flux, which is when the risk of electrostatic discharge exists. This embodiment may be thought of as an open loop embodiment because the electron flux level is independent of any characteristics of the actual circuit 26.

Referring now to FIG. 6, an embodiment using the surface potential sensor is illustrated. In step 60, the surface potential of the dielectric material is measured. The surface potential is measured in volts. In step 62 when the surface potential is not greater than a surface potential threshold, heater is turned off in step 63. Thereafter, step 60 is performed. In step 62 when the surface potential is greater than a surface potential threshold, the heater is turned on in step 64. The system returns to step 60, which again measures the surface potential 60. In this manner a closed loop system is provided. That is, a desirable surface potential may be maintained using heater control. The system illustrated in FIG. 6 thus reduces the amount of energy consumed than that illustrated in FIG. 5.

Advantageously, by controlling the heating, the heaters are predicted to be on less than one percent of the time in a spacecraft environment. Thus, the impact on the life of the material or the electronic components is negligible. By mitigating electrostatic discharge as described above, the potential for circuit upset or device burnout is eliminated. By comparison, continuously operating the component at a higher temperature, such as 75 degrees Celsius temperature, would reduce the mean time to failure by a factor of over 2000, based upon reliability prediction methods of MIL-HDBK-217 for room temperature operation.

While particular embodiments of the invention have been shown and described, numerous variations and alternate embodiments will occur to those skilled in the art. Accordingly, it is intended that the invention be limited only in terms of the appended claims.

What is claimed is:

1. A control circuit of controlling electrostatic discharge of a dielectric component comprising:
    a heater thermally coupled to the component;
    a sensor sensing a sensed condition; and
    a controller coupled to the heater and the sensor, said controller controlling said heater to heat said dielectric component in response to the electrical condition to control electrostatic discharge of the dielectric component.

2. A control circuit for controlling electrostatic discharge of a dielectric component comprising:
    a heater thermally coupled to the component;
    a sensor sensing a sensed condition, said sensed condition being a function of the incident electron flux level on the component; and
    a controller coupled to the heater and the sensor, said controller controlling said heater to heat said component in response to the sensed condition.

3. A control circuit for controlling electrostatic discharge of a dielectric component comprising:
   a heater thermally coupled to the component;
   a surface potential sensor sensing a surface potential of said component; and
   a controller coupled to the heater and the sensor, said controller controlling said heater to heat said component in response to the surface potential.

4. A control circuit for controlling electrostatic discharge of a dielectric component comprising:
   a heater thermally coupled to the component;
   an electron flux sensor sensing an electron flux of said component; and
   a controller coupled to the heater and the sensor, said controller controlling said heater to heat said component in response to the electron flux.

5. A control circuit as recited in claim 4 wherein the electron flux sensor is positioned outside a component housing.

6. A control circuit as recited in claim 4 wherein the sensor comprises a space weather sensor positioned adjacent to a ground station, wherein said controller is positioned within said ground station.

7. A control circuit as recited in claim 4 wherein the electron flux sensor is positioned within a component housing.

8. A control circuit as recited in claim 4 wherein the electron flux sensor or surface potential sensor is positioned on a first satellite and said heater is positioned within a second satellite.

9. A control circuit as recited in claim 7 wherein the component housing comprises a spacecraft.

10. A satellite comprising:
    a satellite body;
    a component positioned within the satellite body;
    a heater thermally coupled to the component;
    an electrical sensor sensing an electrical condition proximate said component; and
    a controller coupled to the heater and the sensor, said controller heating said component in response to the electrical condition.

11. A satellite as recited in claim 10 wherein said electrical sensor comprises a surface potential sensor and the electrical condition comprises a surface potential of said component.

12. A satellite as recited in claim 10 wherein said electrical sensor comprises an electron flux sensor and the electrical condition comprises an electron flux of said component.

13. A satellite as recited in claim 12 wherein the electron flux sensor is positioned outside the satellite body.

14. A satellite as recited in claim 12 wherein the electron flux sensor is positioned within the satellite body.

15. A method of controlling electrostatic discharge of a dielectric component comprising:
    measuring an electrical condition proximate a component;
    activating a heater to heat the component in response to the electrical condition; and
    controlling electrostatic discharge of the dielectric component in response to activating the heater.

16. A method as recited in claim 15 wherein the electrical condition comprises a surface potential of the component.

17. A method as recited in claim 16 further comprising deactivating the heater in response to the surface potential.

18. A method as recited in claim 15 wherein the electrical condition comprises an electron flux proximate the component.

19. A method as recited in claim 15 wherein the electrical condition is measured at a first satellite and activating is performed at a second satellite.

20. A method as recited in claim 15 wherein the electrical condition is measured at a ground station and activating is performed at the ground station.

21. A control circuit as recited in claim 5 wherein the component housing comprises a spacecraft.

22. A control circuit as recited in claim 1 wherein said electrical sensor comprises a surface potential sensor and the electrical condition comprises a surface potential of said component.

23. A control circuit as recited in claim 1 wherein said electrical sensor comprises an electron flux sensor and the electrical condition comprises an electron flux of said component.

24. A control circuit as recited in claim 23 wherein the electron flux sensor is positioned outside a satellite body.

25. A control circuit as recited in claim 23 wherein the electron flux sensor is positioned within a satellite body.

26. A control circuit as recited in claim 1 wherein the sensor comprises a space weather sensor.

27. A control circuit as recited in claim 26 wherein the space weather sensor is positioned adjacent to a ground station, wherein said controller is positioned within said ground station.

* * * * *

UNITED STATES PATENT AND TRADEMARK OFFICE
CERTIFICATE OF CORRECTION

PATENT NO. : 6,867,391 B2
DATED : March 15, 2005
INVENTOR(S) : John Michael Bodeau and Philip L. Leung It is certified that error appears in the above-identified patent and that said Letters Patent is hereby corrected as shown below:

<u>Column 4,</u>
Line 49, should read as follows: -- 1. A control circuit for controlling electrostatic discharge --
Line 52, should read as follows: -- an electrical condition sensor sensing an electrical condition; and --

Signed and Sealed this

Seventh Day of June, 2005

JON W. DUDAS
*Director of the United States Patent and Trademark Office*